No. 795,574. PATENTED JULY 25, 1905.
J. L. BARKER.
BAND CUTTER AND FEEDER.
APPLICATION FILED MAR. 22, 1902.
5 SHEETS—SHEET 3.
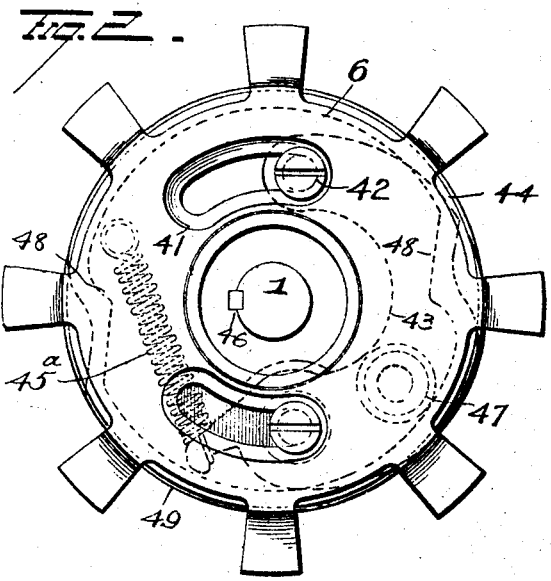
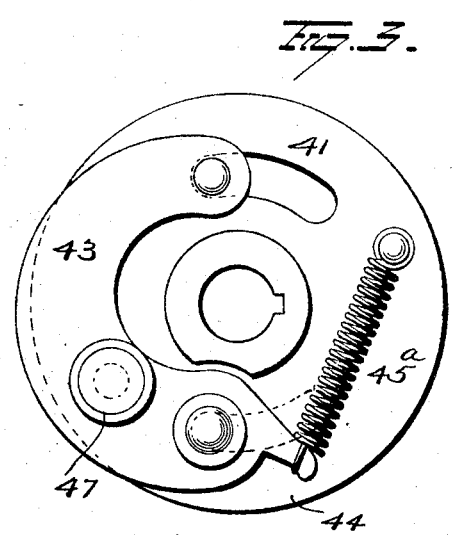
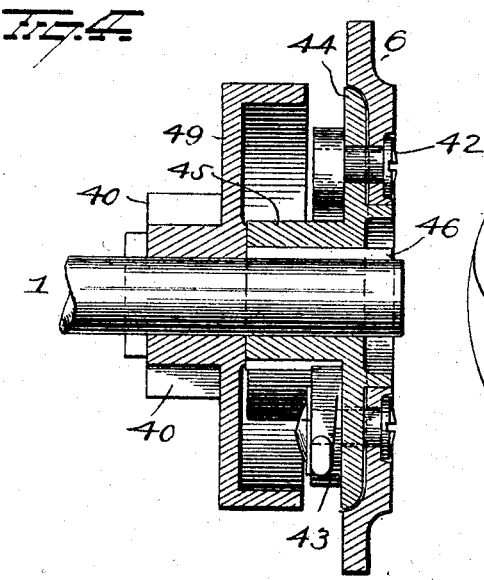
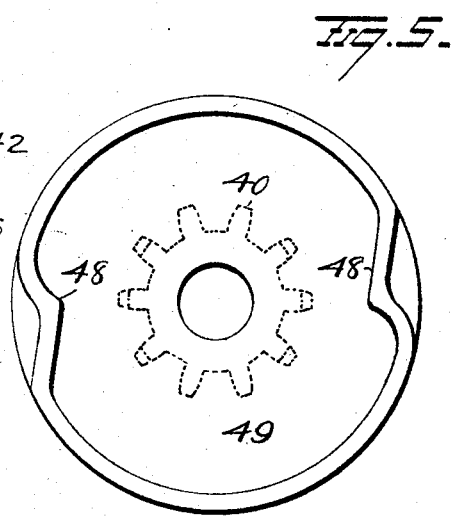
WITNESSES
E. J. Nottingham
G. F. Downing
INVENTOR
J. L. Barker
By H. A. Seymour
Attorney No. 795,574. PATENTED JULY 25, 1905.
J. L. BARKER.
BAND CUTTER AND FEEDER.
APPLICATION FILED MAR. 22, 1902.
5 SHEETS—SHEET 4.
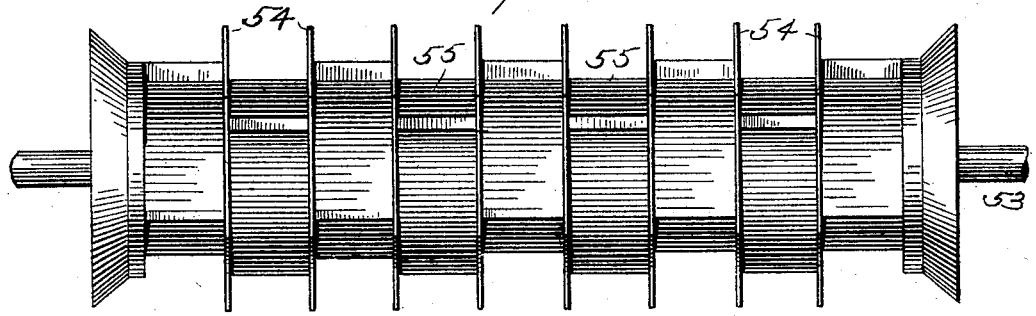
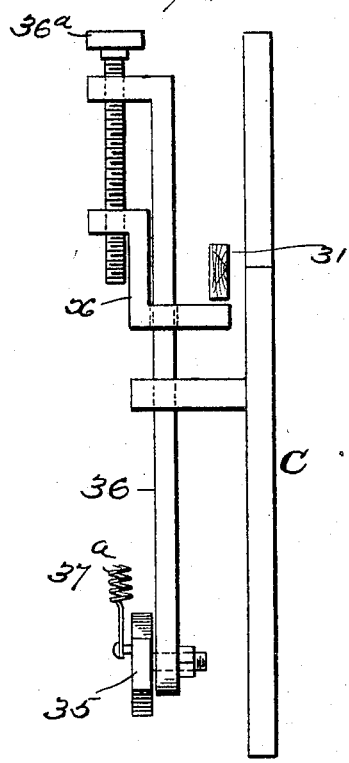
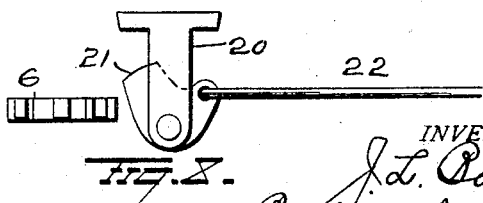

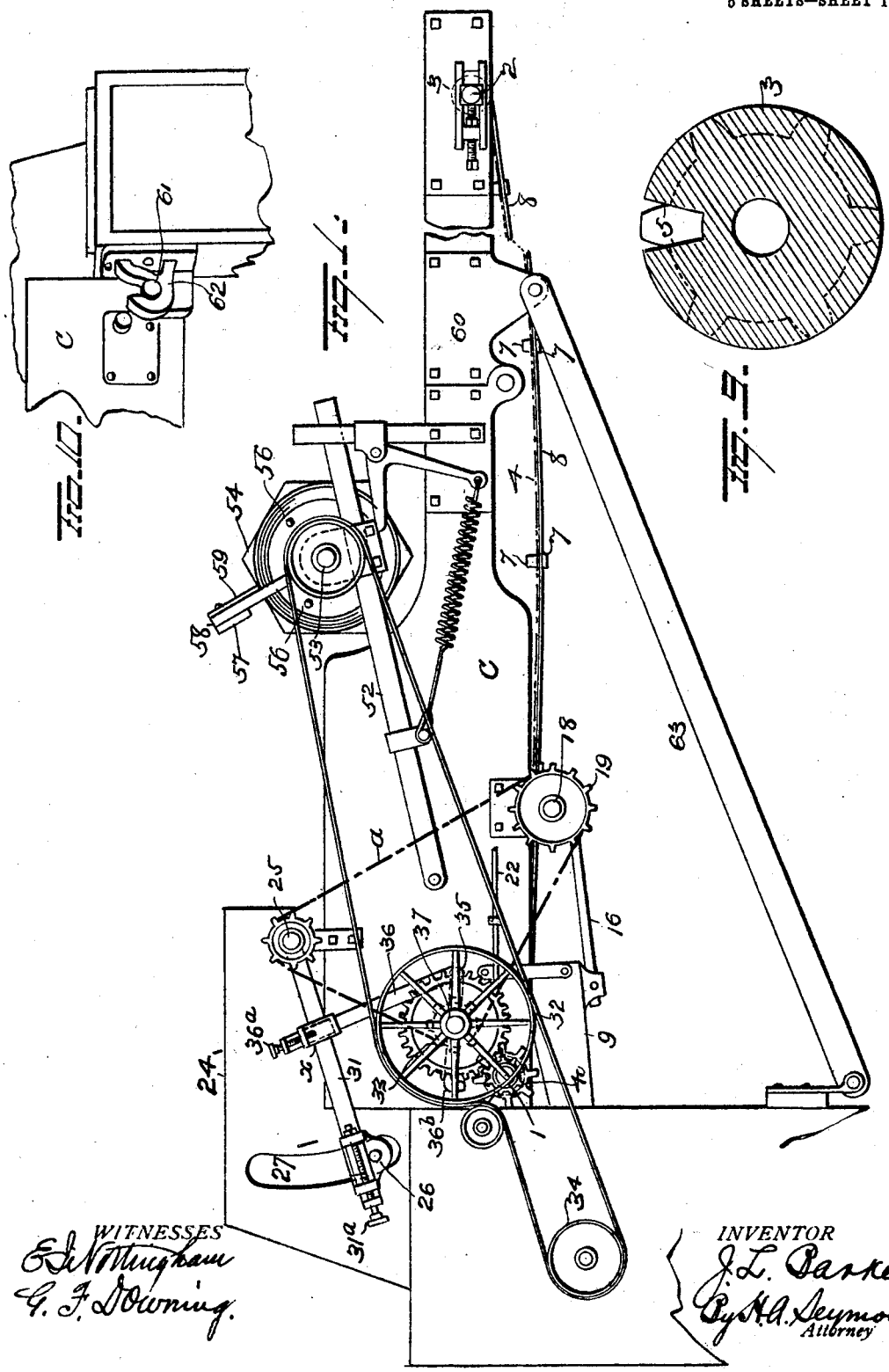

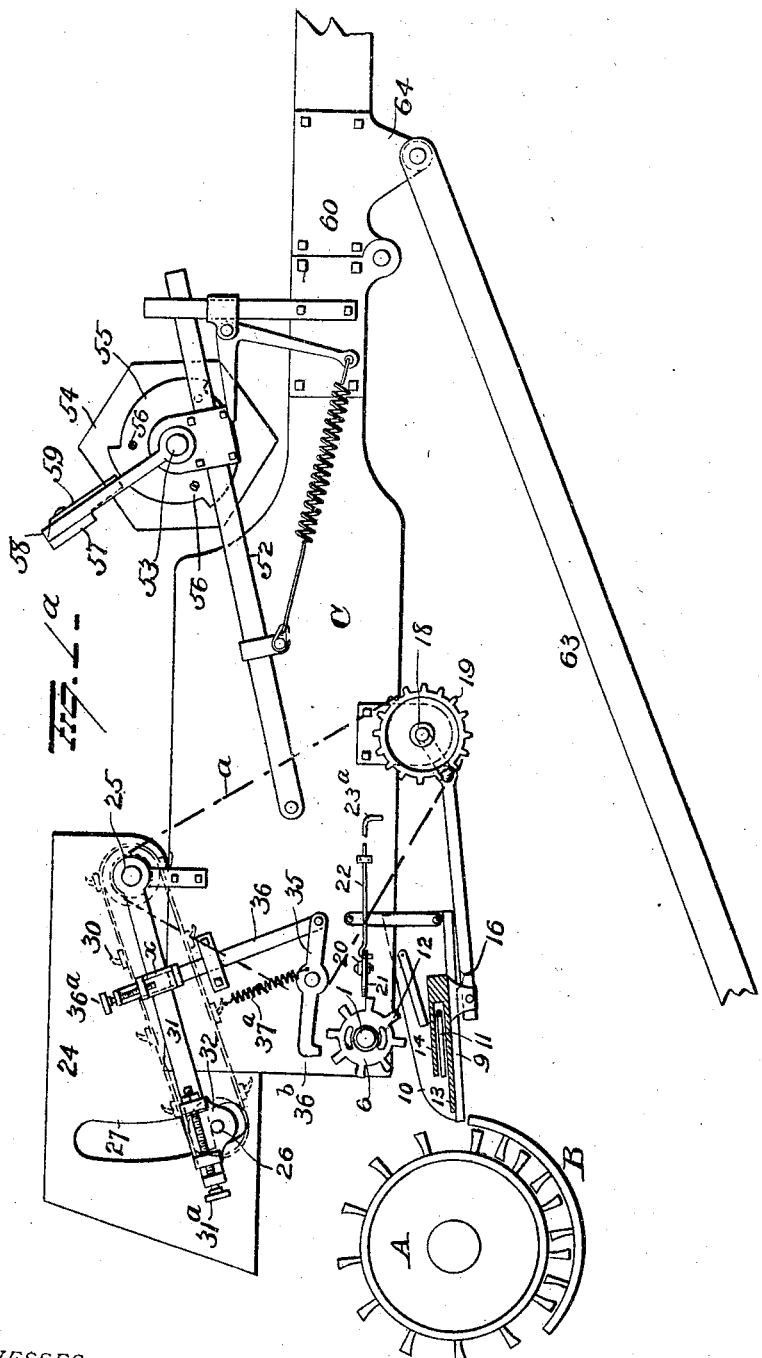

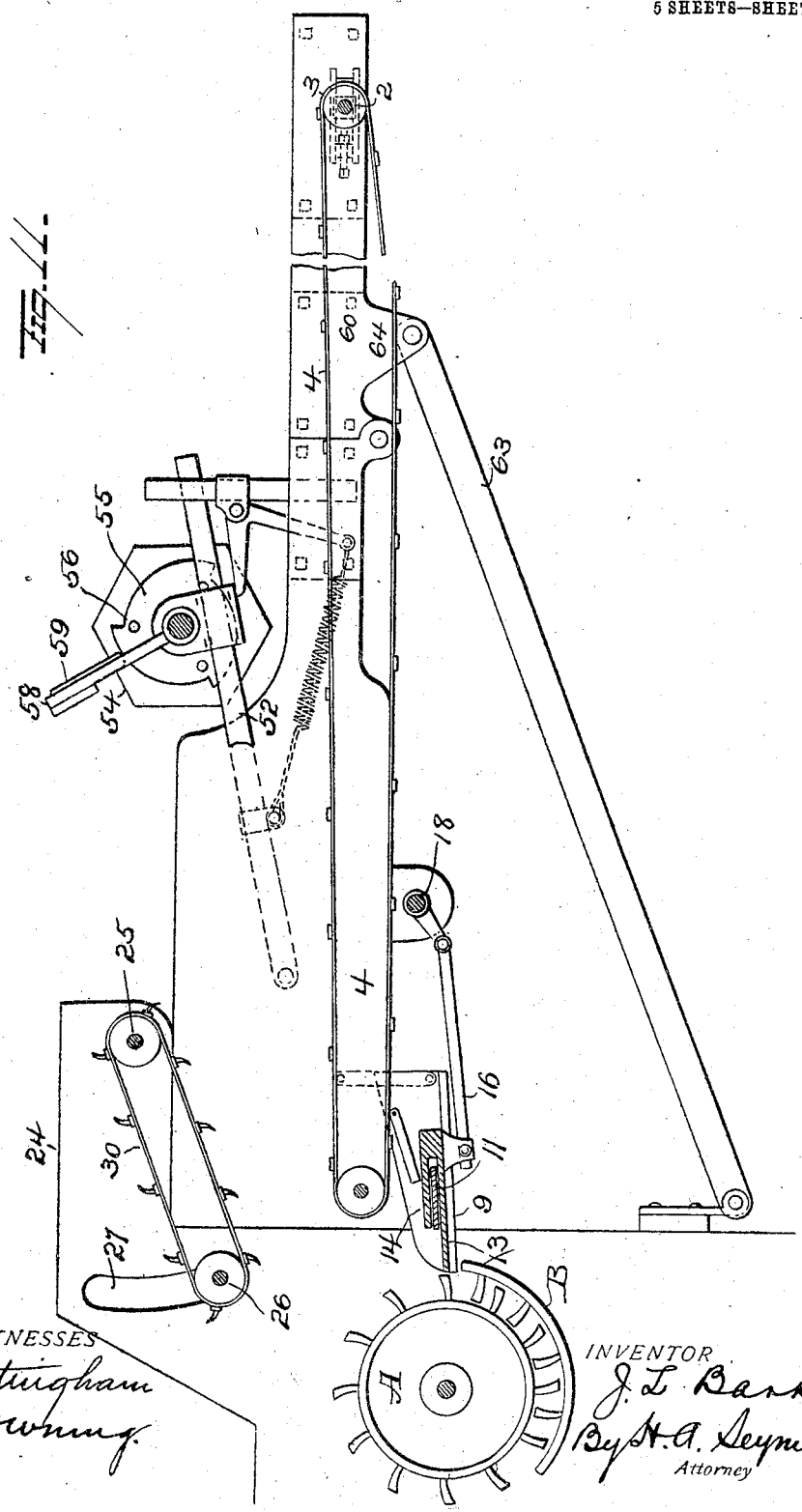

UNITED STATES PATENT OFFICE.

JOHN L. BARKER, OF RACINE, WISCONSIN, ASSIGNOR TO THE BARKER FEEDER COMPANY, OF RACINE, WISCONSIN.

BAND-CUTTER AND FEEDER.

No. 795,574.  Specification of Letters Patent.  Patented July 25, 1905.

Application filed March 22, 1902. Serial No. 99,486.

*To all whom it may concern:*

Be it known that I, JOHN L. BARKER, a resident of Racine, in the county of Racine and State of Wisconsin, have invented certain new and useful Improvements in Band-Cutters and Feeders; and I do hereby declare the following to be a full, clear, and exact description of the invention, such as will enable others skilled in the art to which it appertains to make and use the same.

My invention relates to an improvement in band-cutters and feeders, the object of the invention being to so construct such a machine that it will effectually govern the volume of grain fed to the threshing-cylinder, and thereby prevent the slowing down of motion of the cylinder and the consequent imperfect work of the fan, shoe, and cleaning devices and of the devices for separating the grain from the straw.

A further object is to so construct a feed-board that it will feed the loose grain and chaff to the cylinder with a positive force-feed under all circumstances and in any and all kinds and conditions of grain.

A further object is to provide a band-cutter and feeder with improved means for stopping the feeder instantly, thus placing the feeder under the absolute control of the operator, and to prevent the feeder from running backward when the operating-engine is reversed, as is often the case when putting the belt on the engine and separator.

A further object is to construct a band-cutter and feeder with a combined band-cutter and beater that will effectually cut the bands of the bound grain and thoroughly stir and loosen up the bundle without causing any undue strain on the belts.

A further object is to so construct a band-cutter and feeder that access to the threshing-cylinder may be had easily and quickly when desired.

With these objects in view the invention consists in certain novel features of construction and combinations and arrangements of parts, as will be more fully hereinafter described, and pointed out in the claims.

In the accompanying drawings, Figure 1 is a view in side elevation, partly in section and with some parts removed, illustrating my improvements. Fig. 1ª is a side elevation including the driving mechanism. Figs. 2, 3, 4, and 5 are detail views showing the connection of the wheel 6 with the shaft 1. Fig. 6 is a detail view of the cutter. Figs. 7 and 8 are detail views of the locking devices for the wheel 6. Fig. 9 is a detail sectional view showing the parts 3 5. Fig. 10 is a detail view of the hinge connection. Fig. 11 is a longitudinal sectional view of the apparatus.

A represents an ordinary threshing-cylinder, B a concave below the same, and C C the sides of my improved band-cutter and feeder.

A transversely-disposed shaft 1 is mounted at its respective ends in the sides C at the inner end thereof, and another transverse shaft 2 is mounted at its ends in the sides C at their outer end. Each shaft 1 and 2 carries sprocket-wheels and rollers 3, around which are located an endless conveyer 4, composed of sprocket-chains, attachment-links, and slats 7. The slats 7 are made, preferably, of two parallel strips, with the canvas belt or apron 8 secured between them, and the rollers 3 are provided with longitudinal grooves 5 to receive the slats, and hence permit the feed-board to lie close to the rollers at all times.

A stationary feed-board 9, having upright parallel sides 10, is secured at one end on the concave B, and another stationary board 11 is located above the first-mentioned feed-board, spaced therefrom, and disposed slightly to the rear of the forward end of said first-mentioned board, and still another stationary feed-board 12 is mounted above the feed-board 11 slightly to the rear of its forward edge and is inclined from rear to front, as shown. Between the feed-boards 9 and 11 and 11 and 12 are mounted movable feed-boards 13 and 14, the former and lower feed-board wider than the latter and projecting in advance thereof, both of said feed-boards 13 and 14 being secured together at their rear ends and connected to a crank-shaft 18 by a link 16, as shown. This crank-shaft 18 carries sprocket-wheels 19, over which a belt *a* runs to operate said shaft. The operation of these feed-boards is as follows: Grain and chaff fall onto board 14, and as said latter board is drawn rearward the grain and chaff thereon will be forced against the edge of board 12 and scraped off board 14 onto board 11, and the forward movement of board 14 will scrape the grain and chaff from board 11 onto board 13. The rearward stroke of board 13 will bring the grain and chaff against the edge of board 11 to scrape the same off of board 13 onto board 9, and the forward movement of board 13 will scrape the grain and chaff into the threshing-machine, thus resulting in a most positive feed and preventing any possibility of the escape of grain which may fall onto the feed-boards.

A frame 24 is mounted on the sides C C near the cylinder and concave. A transverse shaft 25 is mounted in the forward portion of the frame 24, near the top thereof, and another transverse shaft 26 is mounted in curved slots 27 in the sides of the frame 24 and is held in its lowest position by gravity. The shafts 25 and 26 carry rollers and sprocket-wheels, around which run sprocket-chains forming part of a toothed feeder 30 to assist in feeding the straw and grain. Rods 31 connect the shafts 25 and 26, and a slide-box 32 is movably mounted on each rod and has bearings for the respective ends of shaft 26, and the free ends of the rods 31, which project beyond shaft 26, are bent into lugs having screw-threaded openings for screws 31$^a$, connected with the slide-boxes and adapted to adjust the latter on the rods 31, and thereby take up slack in the upper feeder. One of said rods 31 rests on an adjustable slide X on a link 36, the lower end of which is attached to one end of a trip-lever 35. A screw 36$^a$ is provided to adjust the slide X longitudinally, and hence regulate the amount of grain which can pass between the lower and upper feeders without stopping the machines, as will now be explained. The trip-lever 35 is pivoted between its ends, has a counterbalance-spring 37$^a$, and has located on its free end a tooth 36$^b$, which latter (when the upper feeder is elevated the proper distance) will move between the teeth of a wheel 6, carried by shaft 1, and hence stop the feeders, and it will be seen that by adjusting the slide X longitudinally the distance of movement of the upper feeder before stopping the lower feeder can be varied at will.

An arbor 37 is located on one side board C and carries pulleys or sprocket-wheels 32 and 33, the former connected by a belt with a pulley 34 on the shaft carrying the threshing-cylinder, and the pulley or sprocket-wheel 33 is connected by a belt or chain $a$ with the pulley or wheel 18 and also with a pulley or wheel on shaft 25 to transmit motion to the upper feeder 30.

The toothed wheel 6 is secured on a disk 44 and is made with curved slots 41 for the reception of headed pins or screws 42 at the respective ends of a curved arm 43, pivotally connected at one end to the disk 44, having an enlarged bearing-sleeve 45 thereon secured to the shaft 1 by means of a key 46. A spring 45$^a$ is connected at its respective ends to the arm 43 and disk 44 to hold the arm 43 in its outer position. A roller 47 is revolubly secured to the arm 43 near the pivotal end thereof and is adapted to be engaged by internal enlargements 48 on a cup 49, secured to or integral with the gear-wheel 40.

One side of each enlargement 48 is curved to receive the roller 47 and turn the disk 44, wheel 6, and shaft carrying the same, while the opposite side of each enlargement 48 is beveled or inclined to force the roller and arm 43, carrying the same, inward, and hence permit the gear-wheel 40 to turn independent of the shaft 1 and toothed wheel 6 when the engine is run backward. When the wheel 6 is engaged by the trip-lever 35, the arm 43 is forced inward and the roller 47 is forced out of engagement with enlargement 48 on cap 49, thereby permitting the shaft 1 to remain stationary, while the upper feeder 30 and feed-boards 13 and 14 continue to operate until the surplus grain is fed into the cylinder by feeder 30, when the upper feeder will resume its normal position, release the wheel 6, and permit the conveyer to operate as before. When the engine is running forward and the feeder is operating, when either the arm 35 or the elbow-lever 27 is brought into engagement with the teeth of wheel 6 wheel 6 is prevented from revolving, and as the disk 44 continues to revolve the pin 42 in arm 43 bears against one end of curved slot 41 in wheel 6. This forces the roller 47 on arm 43 toward the center until roller 47 is released from engagement with enlargement 48 on cap 49, when cap 49 continues to revolve without carrying with it the disk 44 until the upper feeder feeds the surplus grain into the cylinder and falls to its normal position by its own weight, when the rod 31 strikes the slide X on 36, which forces the end of lever 35 downward, thereby releasing the tooth on the other end of arm 35 from engagement with teeth of wheel 6, when spring 45$^a$ forces curved arm 43 outward until the roller 47 on arm 43 is engaged by enlargement 48 on cup 49 and is caused to revolve again, and as disk 44 is secured to the shaft 1, carrying the conveyer-apron, the said apron is stopped and started automatically.

A lug 20 is provided on one of the sides C in proximity to the toothed wheel 6, and an L-shaped or elbow lever 21 is pivotally connected to said lug 20. One member of the lever 21 is connected to a rod 22, supported in a bearing 23, secured to the side C, and said rod extends, preferably, the whole length of the side C and is provided in its free end with a handhold 23$^a$ in convenient reach of the operator. The other member of the lever 21 is adapted to be moved by the rod 22 into the path of the teeth on wheel 6, and hence stop the operation of the conveyer.

On the opposite side boards C elastically-mounted frames 52 are located and support a shaft 53, on which my improved cutters 54 and intermediate beaters 55 are secured. The cutters 54 are hexagonal disks and have interposed between them the blocks or beaters 55, which latter have their peripheries curved, as shown, forming several beater-faces curved in arcs of circles eccentric to the axis of shaft 53, or, in other words, having the bottom of one beater-face extending from the bottom of one adjacent beater-face to the top of the other. All of the cutters and beaters or blocks are made with alined holes to receive rods 56 and secure them rigidly together, and cross-timber 57 (supported on standards 58 above and slightly in rear of the cutters) carries a series of sheet-metal strippers 59, projecting between the cutters.

The conveyer sides C are severed near their centers and hinged, as at 60, the feeder end of the frame being pivotally supported by lugs 61 in brackets 62. A brace-frame 63 is pivotally connected at its lower end to the thresher and at its upper outer end to a casting 64, forming the outer half of the hinges 60, so as to hold the outer end of the frame in a horizontal position when in operation, feeding the grain to the thresher to hold the frame in such position. It will also be seen that by constructing the frame as above explained it can be folded into position and out of the way of the team, hence dispensing with the necessity for an extremely long pole on the thresher.

When desired to examine the cylinder of the thresher, the upper feeder and casing thereon can be swung back out of the way, the pivotal support of the rear roller serving as a hinge.

A great many slight changes might be resorted to in the general form and arrangement of the several parts described without departing from my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination in a threshing-machine, of threshing means, a feeder comprising a series of stationary feed-boards, a series of movable feed-boards alternating with the stationary feed-boards, means for reciprocating the movable feed-boards, which are so placed that at their forward stroke the front edge is carried to a point even with the front edge of the next lower stationary feed-board, and at the rearward stroke is carried to a point even with the forward edge of the next lower stationary feed-board, and at the rearward stroke is carried to a point even with the forward edge of the next upper stationary board, operating as and for the purpose described.

2. In a band-cutter and feeder, the combination with a conveyer, and a toothed wheel connected therewith, of a feeder movably supported above said conveyer, rods connecting the operating-rollers of said feeder, slides on the rods having bearings for the shaft at the movable end of said feeder, means for adjusting said slides, a trip-lever adapted to engage the toothed wheel and stop the operation of the conveyer, and a link connecting said trip-lever with a rod so that when said feeder is elevated by straw and grain passing thereunder the conveyer will be automatically stopped, and means for adjusting the link longitudinally.

3. The combination in a threshing-machine, of two feed-boards disposed one over the other and fixed together at their rear ends, the forward edge of the upper board terminating rearwardly of the forward edge of the lower board, means for moving said boards, and a stationary feed-board between the two movable boards.

4. The combination in a threshing-machine, of a series of stationary feed-boards disposed one above the other and each adjacent board having its front edge in rear of the next lower board, a movable feed-board between each pair of stationary feed-boards, a crank-shaft, a link connecting said movable feed-boards with said crank-shaft to reciprocate the movable feed-boards.

5. A band-cutter and beater, consisting of a shaft, a series of hexagonal cutters thereon, blocks or beaters between the cutters and having their peripheral faces between their radial beating-faces curved in arcs of circles eccentric to the axis of the shaft and a rod or bolt passing through all of said cutters and beaters to secure them together.

6. In a band-cutter and feeder, the combination with two shafts spaced apart and a conveyer around said shafts and operated thereby, of a disk secured on one of said shafts, said disk carrying a toothed wheel loosely mounted thereon, and adapted to rotate partially thereon, a gear-wheel loosely mounted on said shaft, a cap on the gear having inwardly-projecting beveled enlargements thereon, a spring-arm on the disk connected at one end to the toothed wheel, a roller on said arm adapted to be engaged by the enlargements on the cup to turn said disk, two trip-levers adapted to engage said toothed wheel and stop the conveyer-shaft at any point in its revolution, means for automatically operating said trip-lever when too great an amount of straw and grain is being fed to the conveyer and means for independently operating the other trip-lever independently when it is desired to stop the conveyer.

In testimony whereof I have signed this specification in the presence of two subscribing witnesses.

JOHN L. BARKER.

Witnesses:
H. D. STEPHENS,
S. L. GRACE.